United States Patent [19]

Monji et al.

[11] Patent Number: 5,369,580
[45] Date of Patent: Nov. 29, 1994

[54] YAWING-MOMENTUM DETECTING APPARATUS FOR A VEHICLE, A DETECTING METHOD THEREOF, AND MOTION CONTROLLING APPARATUS FOR A VEHICLE, UTILIZING THE DETECTING APPARATUS

[75] Inventors: Tatsuhiko Monji, Katsuta; Shigeru Horikoshi, Mito; Kousaku Shimada; Hayato Sugawara, both of Katsuta, all of Japan

[73] Assignees: Hitachi, Ltd., Tokyo; Hitachi Automotive Engineering Co., Ltd., Ibaraki, both of Japan

[21] Appl. No.: 851,664

[22] Filed: Mar. 16, 1992

[30] Foreign Application Priority Data

Mar. 20, 1991 [JP] Japan ................ 3-056287

[51] Int. Cl.$^5$ .................................................. B62D 6/00
[52] U.S. Cl. .............................. 364/424.01; 180/282; 364/566; 73/505; 73/510
[58] Field of Search ........... 364/424.01, 566; 180/282; 73/505, 507, 510

[56] References Cited

U.S. PATENT DOCUMENTS

| 4,510,802 | 4/1985 | Peters ........................ 73/505 |
| 4,679,808 | 7/1987 | Ito et al. .................... 280/91 |
| 4,704,541 | 11/1987 | Leiber ........................ 307/9 |
| 4,896,268 | 1/1990 | MacGugan ................ 364/453 |
| 4,959,808 | 9/1990 | Neuffer et al. ............. 364/566 |
| 4,968,767 | 3/1990 | Scholl et al. .............. 364/453 |
| 5,087,068 | 2/1992 | Fukanaga et al. ......... 280/707 |
| 5,225,984 | 7/1993 | Nakayama ............... 364/424.05 |
| 5,247,441 | 9/1993 | Serizawa et al. ......... 364/424.05 |
| 5,247,466 | 9/1993 | Shimada et al. .......... 364/566 |

FOREIGN PATENT DOCUMENTS

3608420A1 9/1986 Germany .
4010332A1 10/1990 Germany .
PCT/WO90/-
12698 11/1990 United Kingdom .

*Primary Examiner*—Thomas G. Black
*Assistant Examiner*—Julie D. Day
*Attorney, Agent, or Firm*—Antonelli, Terry, Stout & Kraus

[57] ABSTRACT

A novel yawing-momentum detecting apparatus, and yawing-detecting method for a vehicle, and also a motion controlling apparatus for the vehicle with employment of this yawing-momentum detecting apparatus. The yawing-momentum detecting apparatus for the vehicle comprises: a plurality of acceleration sensors disposed at symmetrical positions on said vehicle with respect to a vertical axis passing through a gravity center of the vehicle within a plane perpendicular the vertical axis; units for calculating yawing momentum of the vehicle occurring around the vertical axis based upon outputs from the plural acceleration sensors; and characteristic correcting units for correcting output characteristics of the plural acceleration sensors under known acceleration values to coincide with reference output characteristic values when the known acceleration values are obtained under a certain vehicle operating condition. A further embodiment of the present invention further includes: units for calculating target yawing momentum based on a vehicle speed and a steering angle of a steering wheel while a car driver manipulates the steering wheel; and units for adjusting a steering apparatus and/or a braking apparatus of the vehicle in such a manner that the yawing momentum obtained by the yawing-momentum calculating units is coincident with the target yawing momentum.

5 Claims, 9 Drawing Sheets

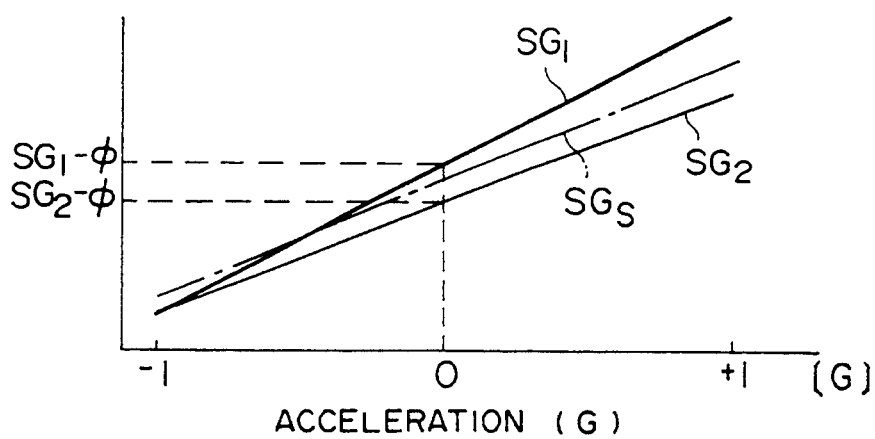
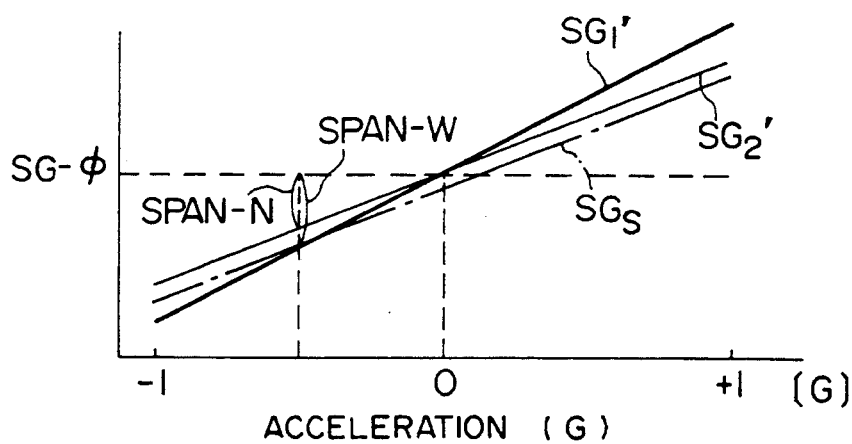
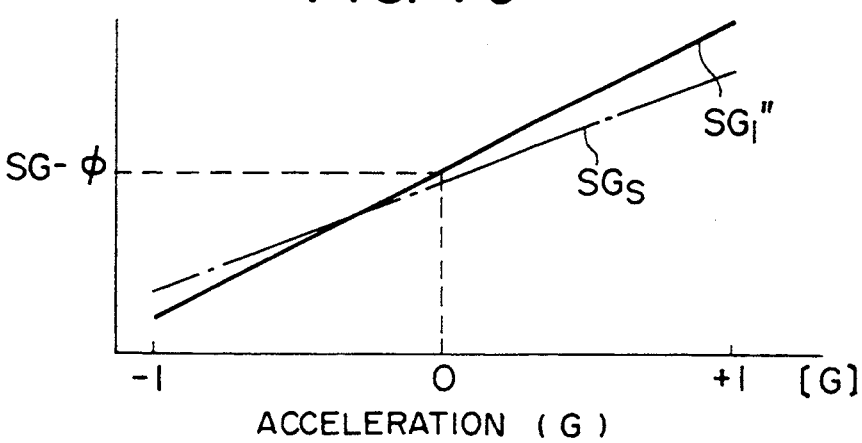

FIG. IIA
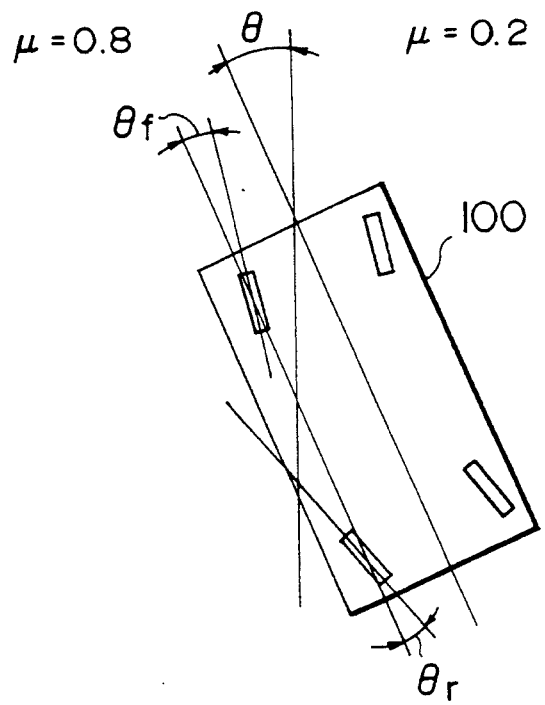
FIG. IIB
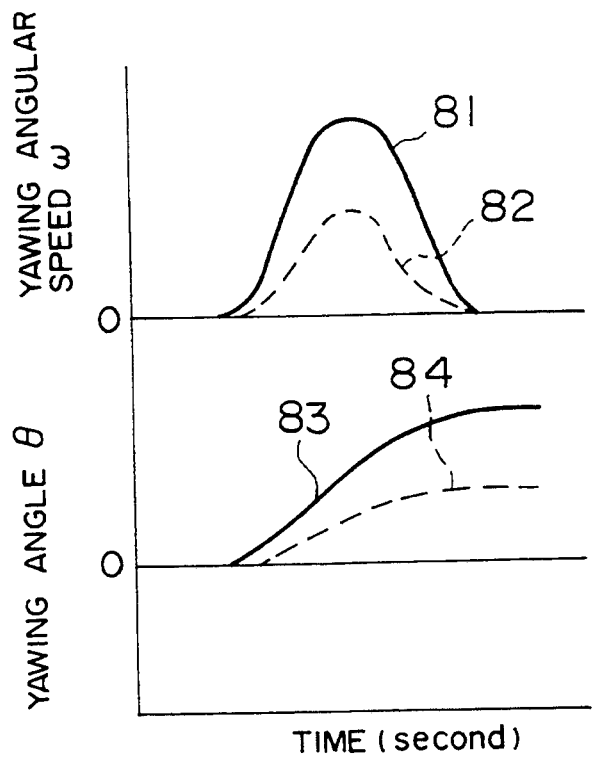

YAWING-MOMENTUM DETECTING APPARATUS FOR A VEHICLE, A DETECTING METHOD THEREOF, AND MOTION CONTROLLING APPARATUS FOR A VEHICLE, UTILIZING THE DETECTING APPARATUS

BACKGROUND OF THE INVENTION

The present invention relates to a yawing-momentum detecting apparatus for a vehicle and a detecting method for detecting yawing momentum of the vehicle. Moreover, the present invention relates to a motion controlling apparatus for a vehicle, for controlling motion of the vehicle by utilizing this yawing-momentum detecting method and apparatus.

It has been known, as detectors for detecting angular momentum of a moving object, various detectors with employment of, for example, opto-gyroscope and vibrating gyroscope or the like. There are various problems when such conventional detecting apparatuses for detecting angular momentum are employed in vehicles, namely costs thereof, and also complexities in handling of the apparatus and structures.

To solve these problems, one angular-momentum detecting apparatus has been described in, for instance, Japanese Patent Application Unexamined publication No. JP-A-60-88311. Also, another angular-momentum detecting apparatus with employment of the algebraic method to correct the outputs is known from the publication of Japanese Patent Application unexamined publication No. JP-A-64-25203.

However, there is another problem in the above-described prior arts whereby errors in detecting the yawing momentum are caused by aging effects in the characteristics of the acceleration sensors, and also precision errors in mounting the acceleration sensors frequently occur (in particular, characteristic fluctuation in a pair of acceleration sensors).

SUMMARY OF THE INVENTION

Therefore, an object of the present invention is to provide both a yawing-momentum detecting apparatus for a vehicle and a detecting method thereof capable of automatically correcting errors caused by aging effects of yawing-momentum detecting characteristics in acceleration sensors, precisely mounting these acceleration sensors for employment in a vehicle, and also maintaining high precision yawing-momentum detecting operation for a long term.

Also, another object of the present invention is to provide a motion controlling apparatus for a vehicle, capable of stably controlling driveabilities of a vehicle at a high level of precision, with employment of the above-described yawing-momentum detecting apparatus and the detecting method thereof.

Furthermore, another object of the present invention is to provide a yawing-momentum detecting apparatus for a vehicle, a detecting method thereof, as well as a motion controlling apparatus for a vehicle which utilizes both the yawing-momentum detecting apparatus and the corresponding yawing-momentum detecting method, capable of automatically correcting errors caused by a positional shift of a detecting axis when acceleration sensors are mounted to the vehicle and by unbalanced output characteristics of the acceleration sensors produced during manufacturing thereof.

The above-described objects of the present invention may be first achieved by providing a yawing-momentum detecting apparatus for a vehicle, in which acceleration sensors are mounted on a plurality of symmetrical positions with respect to a center axis of a vehicle within a plane positioned in parallel with a floor plane of the vehicle. Yawing momentum of the vehicle is detected based on output signals derived from the acceleration sensors. Correcting means are provided for mutually adjusting characteristics of the acceleration sensors, while output signals are fetched from the acceleration sensors under a predetermined condition wherein the vehicle is driven along a straight path, and the sensors' characteristics are corrected based on the fetched output signals.

Other objects of the present invention may also be achieved by providing a motion control apparatus of a vehicle, for controlling a steering angle of a vehicle based on a signal related to the yawing momentum obtained by the above-described yawing-momentum detecting apparatus for the vehicle, as a feedback signal.

In accordance with a preferred embodiment of the yawing-momentum detecting apparatus for the vehicle, the following errors can be suppressed by the correcting apparatus making a zero point of one acceleration sensor to be a reference coincident with a zero point of the other acceleration sensor under such conditions that a proper judgement can be made if the vehicle is stopped. That is to say the correcting apparatus can suppress, (i) errors in detecting the yawing momentum that are caused by changes in the zero point due to the aging effect; (ii) errors in detecting of the yawing momentum that are caused when an angle of a detecting axis is shifted in vertical direction with respect to a horizontal plane when the acceleration sensors are mounted; and also (iii) errors in detecting the yawing momentum caused by deviating an output value at a zero point of the acceleration sensor from a designed value during the manufacturing thereof. Consequently, it is possible to correctly and precisely detect the yawing momentum of the vehicle, and thus it is also possible to preferably control the motion of the vehicle.

Also, in accordance with another preferred embodiment of the present invention, when an acceleration value of a vehicle reaches a predetermined positive or negative acceleration value while driving the vehicle along a straight path, the following errors in the yawing momentum detections may be reduced or removed completely by making a span of one acceleration sensor functioning to be a reference coincident with another span of the other acceleration sensor. That is to say the further embodiment can eliminate, (i) errors in detecting of the yawing momentum that are caused when the span is varied due to the aging effect; (ii) errors in detecting of the yawing momentum which are caused under such conditions that whereby an angle of a detection axis of an angular sensor is positionally shifted in either a vertical direction or a horizontal direction with respect to a reference axis, and therefore the span for the actual acceleration is different from the actual acceleration; and (iii) errors in detecting of the yawing momentum which are caused by deviation of the output span for the actual acceleration when the acceleration sensors are manufactured.

BRIEF DESCRIPTION OF THE DRAWINGS

FIGS. 7A, 7B and 7C are graphic representations for showing output correcting methods of the acceleration sensor;

FIGS. 11A and 11B are a state explanatory diagram used for explaining the yawing-momentum feedback control and an output signal waveform diagram, respectively.

DESCRIPTION OF THE PREFERRED EMBODIMENTS

Referring now to the accompanying drawings, a detailed description will be made of a preferred embodiment of the present invention.

Figure 1:
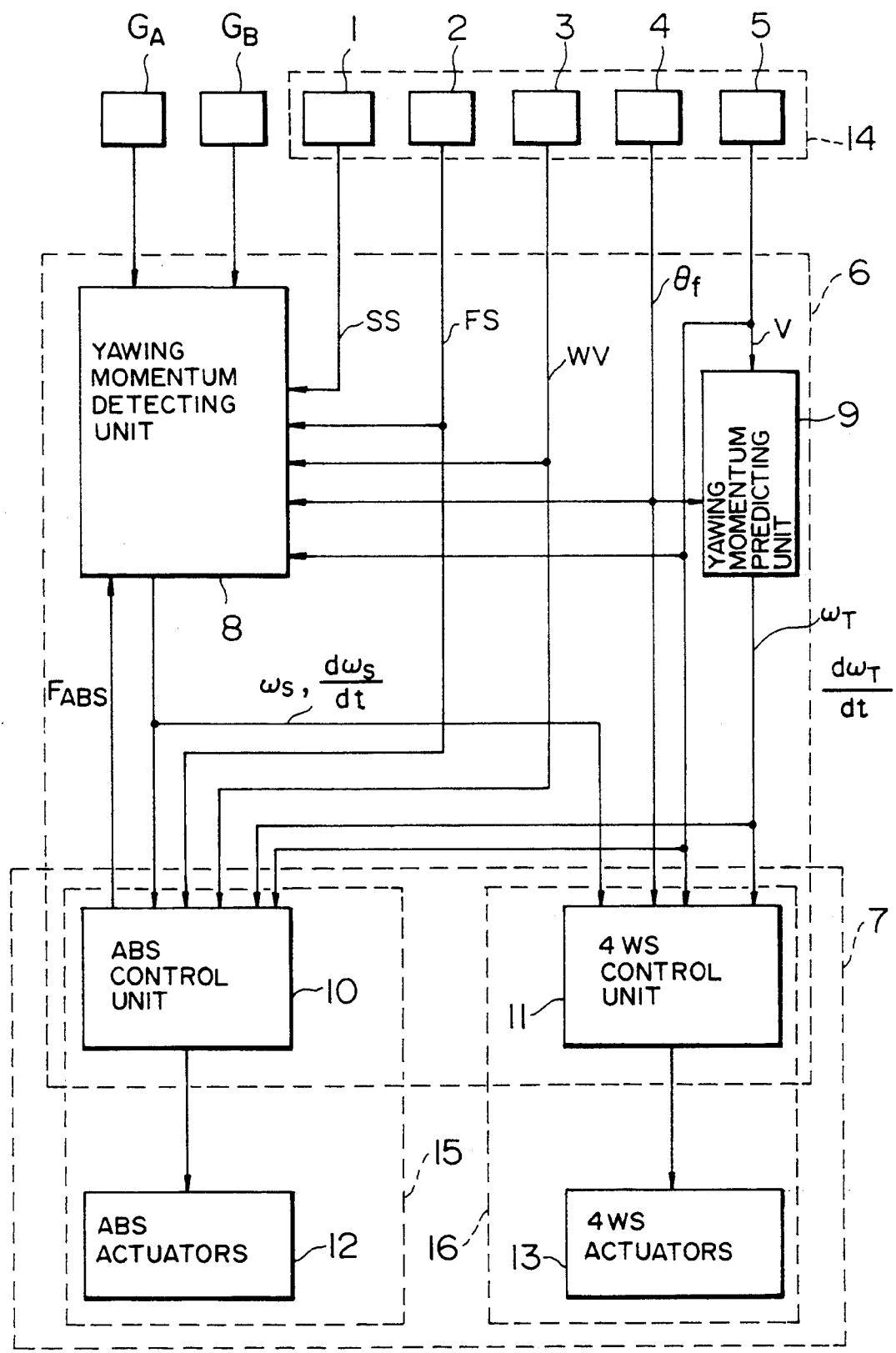
FIG. 1 is a schematic block diagram for showing a structure of a yawing-momentum detecting apparatus and also of a motion control apparatus for a vehicle, which utilizes the yawing-momentum detecting apparatus.

In FIG. 1, there is shown a motion control apparatus for a vehicle, which detects yawing motion occurring in the vehicle, and also controls motion of the vehicle in a stable condition by utilizing the detected yawing motion. In this drawing, yawing momentum of the vehicle is detected by employing an acceleration sensor (will be referred to a "G-sensor"). More specifically, a yawing-angle acceleration and a yawing angular velocity are detected, and then the yawing motion of the vehicle is controlled by utilizing the yawing-angle acceleration and the yawing angular velocity as a feedback signal.

In this motion control apparatus, there are provided two G-sensors "$G_A$" and "$G_B$", and also another sensor 14. Furthermore, there are employed as an apparatus for controlling yawing motion of a vehicle, for instance, an anti-lock break system (will be referred to as an "ABS") 15, a four-wheel steering system (will be referred to as a "4WS") 16 and so on. In addition, there is provided a control unit 6 for receiving signals derived from the above-described sensors and for performing a predetermined calculation process so as to control actuators of ABS, 4WS and the like.

Figure 2:
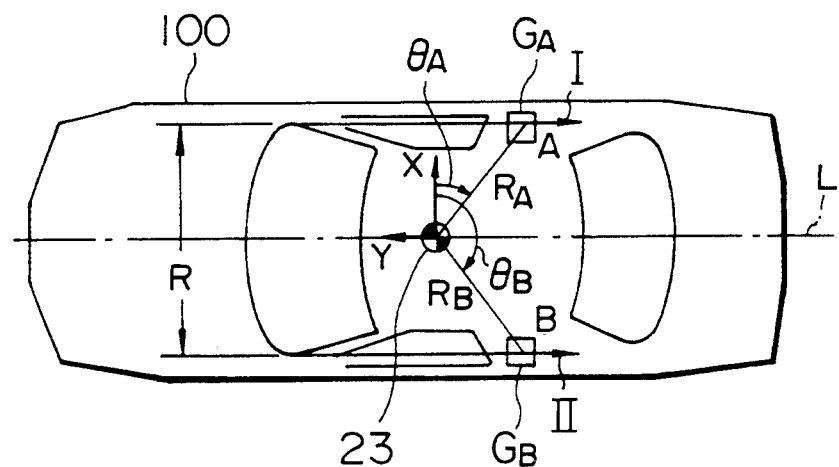
FIG. 2 is a top view of a vehicle used for explaining a structure for mounting an acceleration sensor on the vehicle.

First, two G-sensors "$G_A$" and "$G_B$" will now be explained. A pair of these G-sensors are symmetrically arranged in a plane which vertically intersects a vertical axis passing through the center of gravity of a vehicle. Specifically, as shown in FIG. 2, these G-sensors are mounted on a plane parallel to a floor plane of the vehicle 100 in such a manner that they are provided on both symmetrical positions with respect to a center line "L" of a vehicle 100 along a driving direction (namely, a left direction as viewed in this figure). The mounting directions of these sensors are indicated by arrows "I" and "II". In other words, these sensors are mounted in the above-explained plane in such a way that they are directed opposite to the driving direction of the vehicle.

Figure 4:
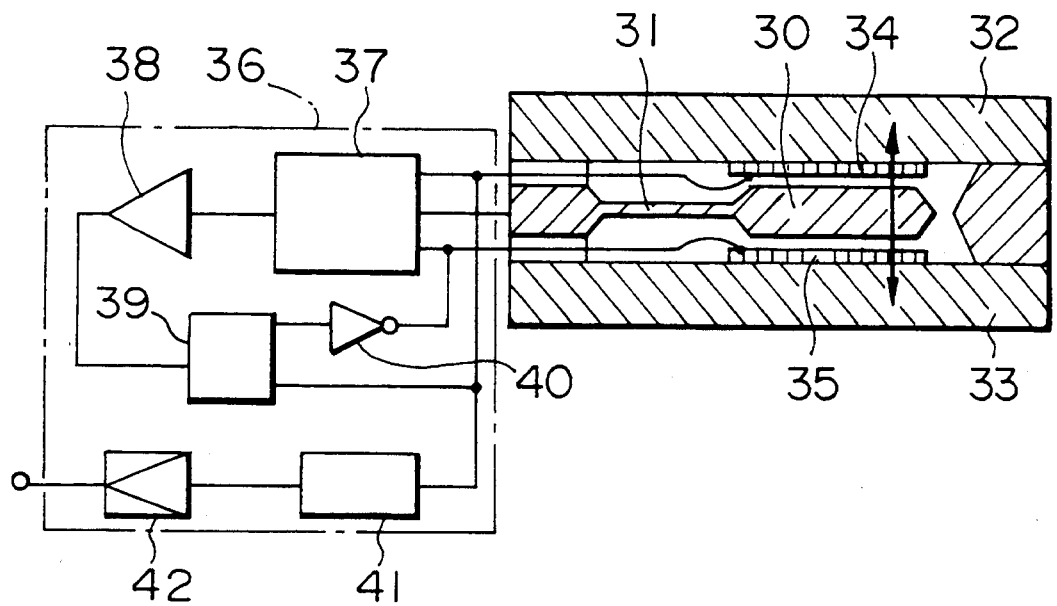
FIG. 4 is a circuit arrangement for showing an example of an acceleration sensor employed in the motion control apparatus for the vehicle.

Such G-sensors will now be described more in detail. As shown in FIG. 4, the G-sensors are semi-conductor G-sensors for utilizing the electrostatic servo system. In this sensor example of FIG. 4, inertia force is exerted to an inertia body 30 when acceleration is applied thereto along either direction depicted by the arrow, and thus a cantilever 31 is deflected so that the position thereof is moved in a direction along which the acceleration is applied. At the same time, in response to a change occurring in a size of a space between the inertia body 30, and also electrodes 34 and 35 formed on insulating plates 32 and 33, a capacitance (electrostatic capacity) of a capacitor formed by two upper/lower electrodes 34, 35 and the inertia body 30.

Generally speaking, a capacitance "C" of a capacitor is expressed as follows:

$$C = \epsilon s/d,$$

where symbol "$\epsilon$" indicates dielectric constant, symbol "S" denotes an area of an electrode, and symbol "d" represents a size of a space. That is to say, the G-sensor used in the present invention, detects acceleration by an acceleration detecting circuit 36 by utilizing such an acceleration dependency of this capacitance. An acceleration detecting system is a so-called electrostatic servo system in which a voltage appearing between the electrodes is controlled based on an amount of feedback received in response to a certain degree of the detected acceleration, so that the position of the inertia body 30 is continuously positioned at a center between two electrodes 34 and 35. In an acceleration detecting circuit 36, a variation amount "$\Delta C$" of the capacitance "C" is detected by a detector 37, the detected variation amount "$\Delta C$" is amplified by an amplifier 38, and then, for example, a pulse-width-modulation (PWM) inverter 39 is controlled in such a manner that this resultant signal becomes zero (0). Also, such a control is carried out that the inertia body 30 is always positioned at constant position (namely, a center between the electrodes 34 and 35) by way of the electrostatic force exerted on both of the electrodes 34 and 35, by applying a voltage signal which is obtained by converting an output from the PWM inverter 39 in a converter 40, to the electrodes 34 and 35 vertically arranged in relation to each other. Then, the control signal from the PWM inverter 39 is input via a low-pass filter 41 into an amplifier 42, and acceleration is produced from an output of this amplifier 42.

Figure 5:
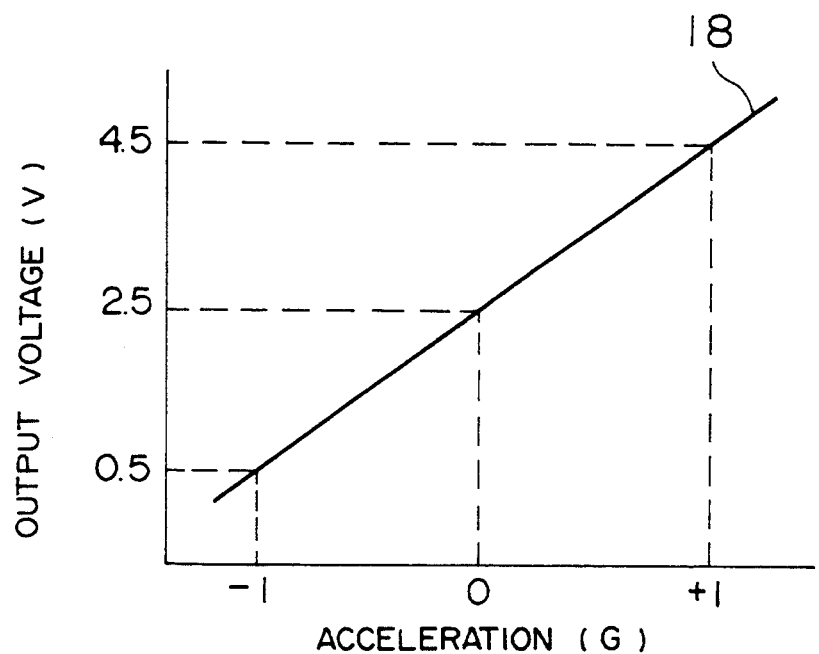
FIG. 5 is a graphic representation for showing an output characteristic of the acceleration sensor.

A relationship between the output from the "G" sensor and the acceleration is represented as a solid line in FIG. 5. This output characteristic (namely, indicated by a solid line 18 of this figure) is referred to a basic output characteristic of this "G" sensor.

Also, other sensors 14 include the known various sensors such as a parking brake switch 41, a foot brake switch 42, a wheel speed sensor 3, a steering wheel angle sensor 4, a vehicle speed sensor or the like.

Referring back to FIG. 1, in an apparatus 7 for controlling yawing motion of a vehicle, the ABS 15 is constructed of an ABS control unit 10 and an ABS actuator 12, and on the other hand, the 4WS 16 is arranged by a 4WS control unit 11 and a 4WS actuator 13.

Figure 3:
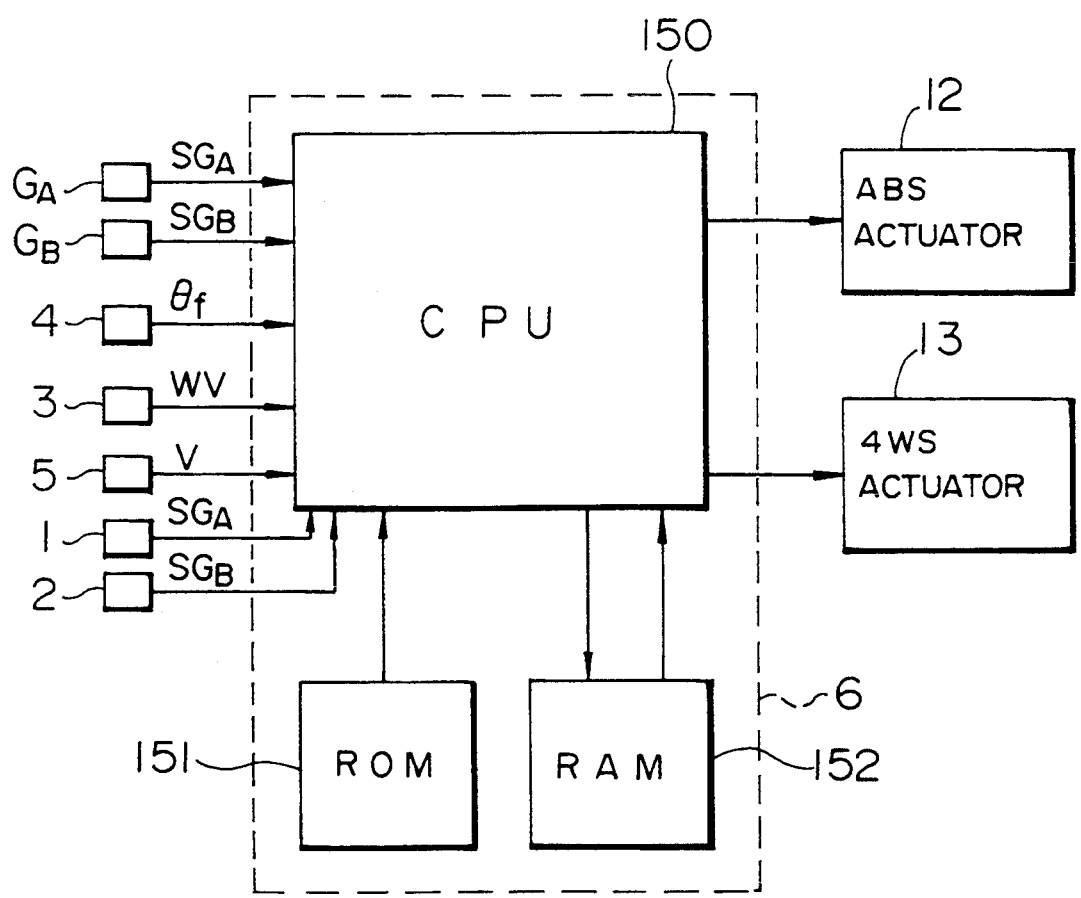
FIG. 3 is a circuit diagram for representing a structure of a control unit employed in the motion control apparatus for the vehicle.

Then, a control unit 6 is constructed of, as shown in FIG. 3, a central processing unit (CPU) 150, a read-only memory (ROM) 151 functioning as a storage device, and a random access memory (RAM) 152. The CPU 150 executes a predetermined calculation on four fundamental arithmetic rules, a comparison calculation, and also a control of input/output signals, whereas the ROM 151 stores therein constants used in the above-described calculations or the like and programs. The RAM 152 is employed so as to store variables or the like. Further, this control unit 6 is constructed of, as represented in FIG. 1, a yawing-momentum calculating unit 8, a yawing-momentum predicting unit 9, an ABS control unit 10 and a 4WS control unit 11, in view of controlling contents. The flow of signals among these constructive units are indicated by the arrows of FIG. 1.

First, both a signal $\theta_f$ derived from the steering wheel angle sensor 4, and a signal V derived from the vehicle speed sensor 5 are input into the yawing-momentum predicting unit 9. Then, yawing momentum $\omega_T$ and d/dt ($\omega_T$) of the vehicle is inferred based upon these signals by this yawing-momentum predicting unit 9.

The yawing-momentum calculating unit 8 received as input signals, output signals from the G-sensors $G_A$, $G_B$; a signal SS from the parking brake switch 1; a signal FS from the foot break switch 2; a signal WV from the vehicle speed sensor 3, a signal $\theta_f$ from the steering wheel angle sensor 4, and also a signal $F_{ABS}$ from the ABS control unit 10. Then, both $\omega s$ and d/dt ($\omega s$) are calculated by the yawing-momentum calculating unit 8 as the yawing momentum in accordance with a method (will be discussed later).

On the other hand, the signal FS from the foot brake switch 2, the signal WV from the wheel speed sensor 3, the signal V from the vehicle speed sensor 5, the yawing-momentum signal $\omega s$, d/dt ($\omega s$) from the yawing-momentum detecting unit 8, and also the inferred yawing-momentum signal $\omega T$, d/dt ($\omega T$) from the yawing-momentum predicting unit 9 are input into the above-described ABS control unit 10. Based on these signals, the ABS control unit 10 outputs to the ABS actuator 12, a signal capable of controlling the yawing motion, while maintaining the braking force or effect.

Also, the yawing-momentum signal $\omega s$, d/dt ($\omega s$) from the yawing-momentum calculating unit 8, the signal $\theta_f$ from the steering wheel angle sensor 4, the signal V from the vehicle speed sensor 5, and furthermore the inferred yawing-momentum signal $\omega T$, d/dt ($\omega T$) from the yawing-momentum predicting unit 9 are supplied to the 4WS control unit 11, so that a control signal for controlling the yawing motion of the vehicle is output to the 4WS actuator 13 based on these signals.

Figure 6:
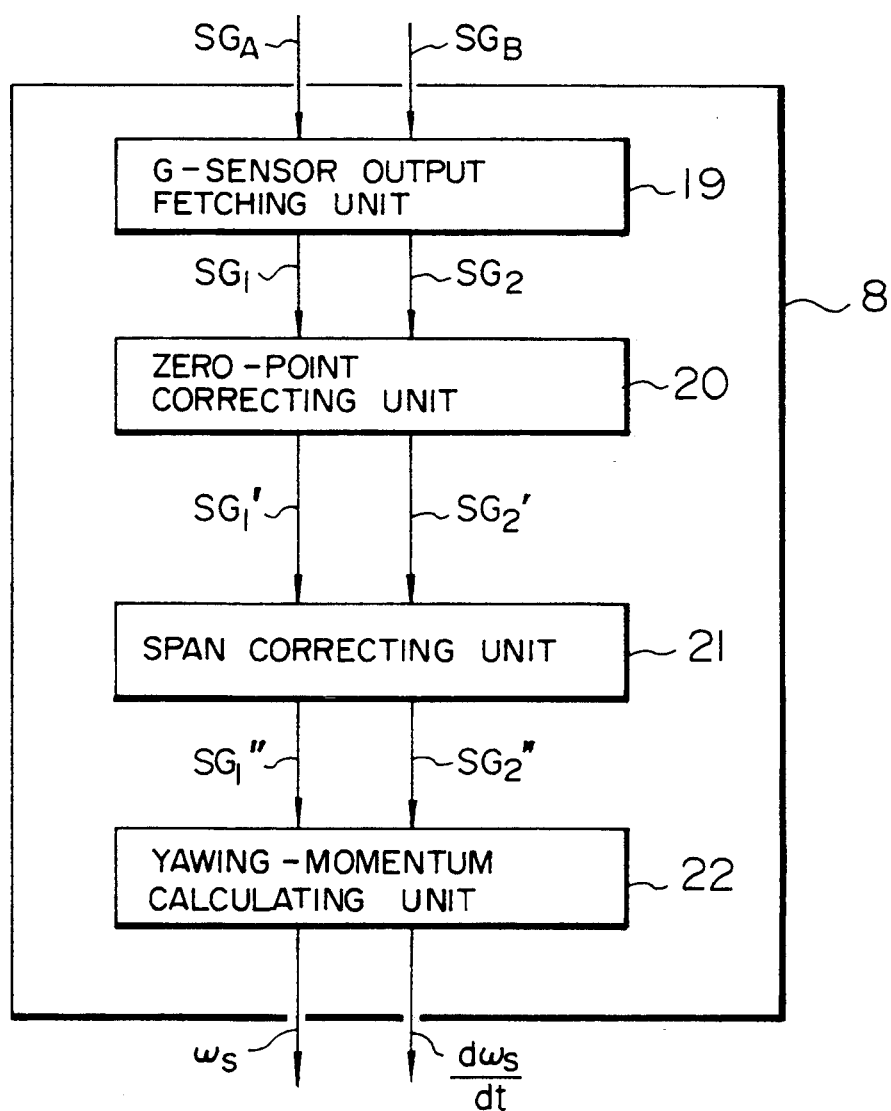
FIG. 6 is an operation block diagram for explaining a control operation of the motion control apparatus for the vehicle.

Referring now to FIG. 6, a method for obtaining the yawing momentum $\omega s$ and d/dt ($\omega s$) of the vehicle based on the output signals $S_{GA}$ and $S_{GB}$ derived from the G-sensors $G_A$ and $G_B$, which is carried out in the above-explained yawing-momentum calculating unit 8, will be described more in detail.

First of all, the signals $S_{GA}$ and $S_{GB}$ derived from the G-sensors $G_A$ and $G_B$ are fetched into a G-sensor output fetching unit 19, so that these signals are filtered to eliminate noise components and the like therefrom.

The characteristics of the signals $S_{GA}$ and $S_{GB}$ which have been filtered by the G-sensor output fetching unit 19, are different from the basic output characteristic 18 shown in FIG. 5, due to variations in the characteristics of the G sensors per se, changes in ambient temperatures of the G-sensors, positional shifts and angular shifts in setting of the G-sensors, and the like. For example, in case that a sensing axis of the G-sensors (namely, corresponding to a direction along which the inertia body 30 is moved shown in FIG. 4, i.e., a vertical direction) is inclined by a predetermined amount with respect to the horizontal direction, due to the positional shifts and angular shifts in setting of the G-sensors, the outputs from the G-sensors may be influenced by the gravitational acceleration, the output characteristic of which is different from the above-described basic output characteristic.

Accordingly, for instance, when the output signals $S_{GA}$ and $S_{GB}$ from one pair of G-sensors $G_A$ and $G_B$ represent such a characteristic as shown in FIG. 7A, a reference output value for zero-point correction ($S_{GS}$) is determined based on output values (SG1-0, SG2-0) of the G-sensors under such conditions that the acceleration applied to the G-sensors corresponds to 0G (e.g., when the vehicle is stopped) in the zero-point correcting unit 20. Also, in the zero-point correcting unit 20, a neutral point of this reference output value ($S_{GS}$) is coincident with another neutral point of the non-reference output values ($S_{G1}$, $S_{G2}$) by moving the non-reference output characteristic in a parallel form based on a difference between the basic output value ($S_{GS}$) and the non-reference output values ($S_{G1}$, $S_{G2}$). With the above-described correcting operations, the output characteristics of the G-sensors become such characteristics, as shown by symbols $S_{G1}'$ and $S_{G2}'$, that neutral points thereof are coincident with each other.

Furthermore, in a span correcting unit 21, a span correcting reference output is determined based upon an output value when acceleration applied to the G-sensor becomes a certain value. Then, a non-reference output characteristic is converted based on a comparison between an incline of the reference output $S_{GS}$ and inclines of the non-reference outputs $S_{G1}'$ and $S_{G2}'$, and therefore output characteristics $S_{G1}''$ and $S_{G2}''$ are obtained as shown in FIG. 7C, in which both neutral points and inclines thereof are coincident with each other.

Subsequently, the yawing momentum is calculated based on the output signals whose output characteristics have been corrected in accordance with the above-described manner in the yawing-momentum calculating unit 22. The principle of calculating this yawing momentum will now be explained in detail with reference to FIG. 2.

Assuming now that the center 23 of gravity of the vehicle 100 is selected to be an origin in an X-Y coordinate system, a positive direction of the Y axis is set to a driving direction of the vehicle 100 (namely, the left direction as viewed in FIG. 2), and also a positive direction of the X axis is set to an upper direction of this drawing. It should be noted that a pair of the above-described G-sensors $G_A$ and $G_B$ are symmetrically arranged with respect to the above-described Y axis, and then the above-mentioned X-Y plane is positioned to be parallel to a floor plane of the vehicle.

Assuming now that straight lines passing from the gravity center 23 of the vehicle through the mounting points A, B of the G-sensors $G_A$ and $G_B$, are referred to as $R_A$ and $R_B$, the following equation can be satisfied for angles $\theta_a$ and $\theta_B$ among the X axis, straight lines $R_A$ and $R_B$ directed toward the points A and B:

$$\theta_B = \pi - \theta_A \ (\pi = 180°)$$

It should also be noted that since the outputs from the G-sensors own directivities while detecting acceleration, as previously explained, directions as indicated by arrows I and II of this drawing, have positive polarities.

No component related to a roll is detected in the mounting structure of the G-sensors $G_A$ and $G_B$ shown in FIG. 2. Also, components related to a pitch can be canceled by calculating a difference between the output signals $S_{GA}$ and $S_{GB}$ from the G-sensors $G_A$ and $G_B$. Thus, velocities $V_A$, and $V_B$ along the Y axis at the mounting points A and B shown in FIG. 2, correspond to a velocity obtained by synthesizing a velocity $V_g$ in a Y-axis component of the translation motion with a velocity in an Y-axis component of the peripheral speed in the yawing rotation motion. As a result, acceleration signals $S_{GA}$ and $S_{GB}$ detected by the G-sensors are obtained as follows:

$$S_{GA} = d/dt(v_A) = R_A \cdot d/dt(\omega) \cdot \cos\theta_A$$

$$S_{GB} = d/dt(v_B) = R_B \cdot d/dt(\omega) \cdot \cos\theta_B$$

Also, when a difference $\Delta G$ in the detected acceleration is calculated, it is given as follows:

$$\Delta G = S_{GA} - S_{GB}$$
$$= d/dt(\omega) \cdot (R_A \cos\theta_A - R_B \cos\theta_B)$$

Here, since $R_A \cos\Theta_A - R_B \cos\theta_B = R$, it becomes:

$$d/dt(\omega) = \Delta G/R,$$

where symbol "R" indicates a width for mounting two G-sensors $G_A$, and $G_B$.

As described above, the yawing angular acceleration $d/dt(\omega)$ of the vehicle may be obtained from the detection signals $S_{GA}$ and $S_{GB}$ derived from the G-sensors $G_A$ and $G_B$.

Figure 8:
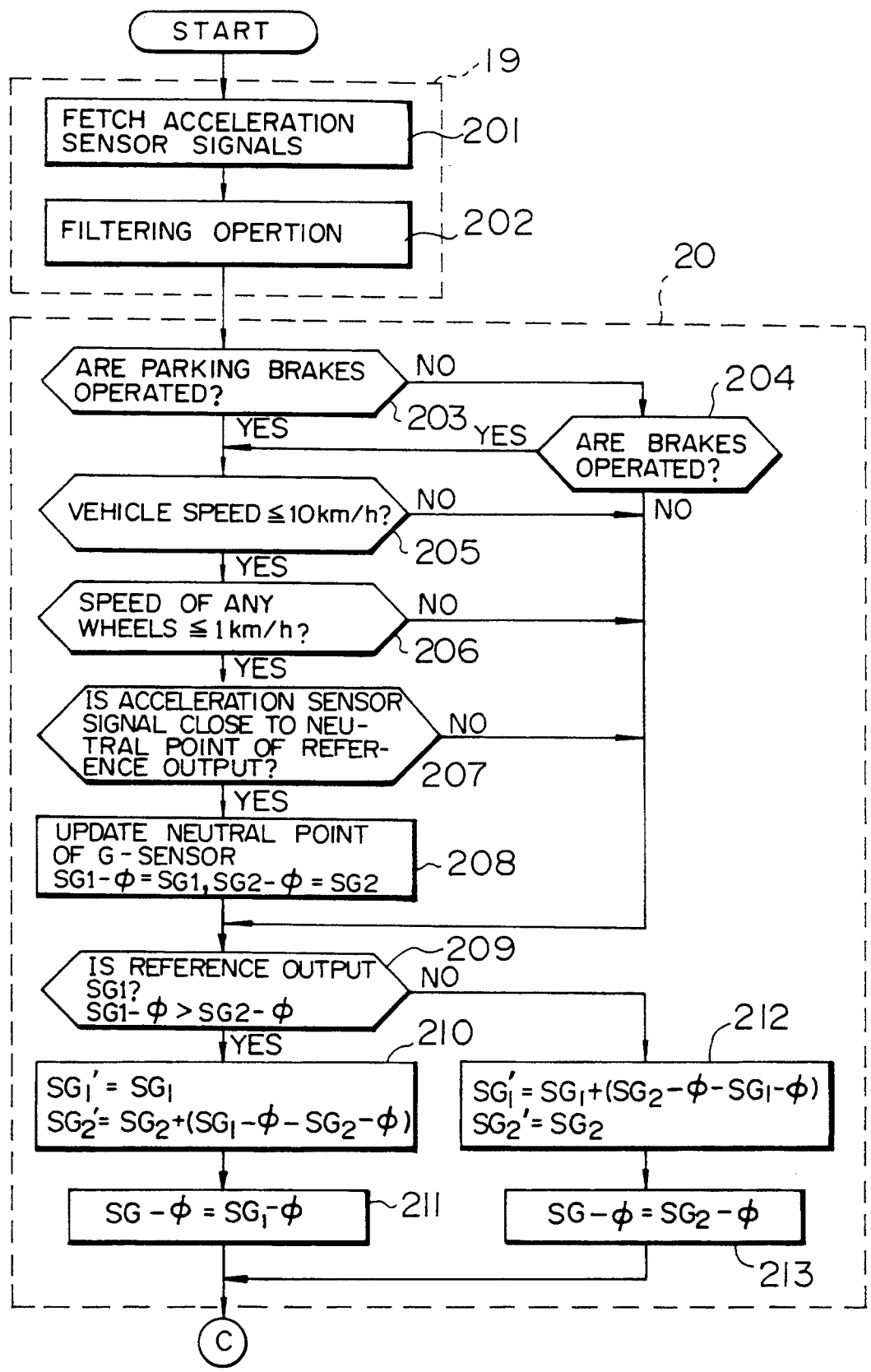
FIG. 8 is an example of a flow chart for showing in detail the output correcting method of the acceleration sensor.
Figure 9:
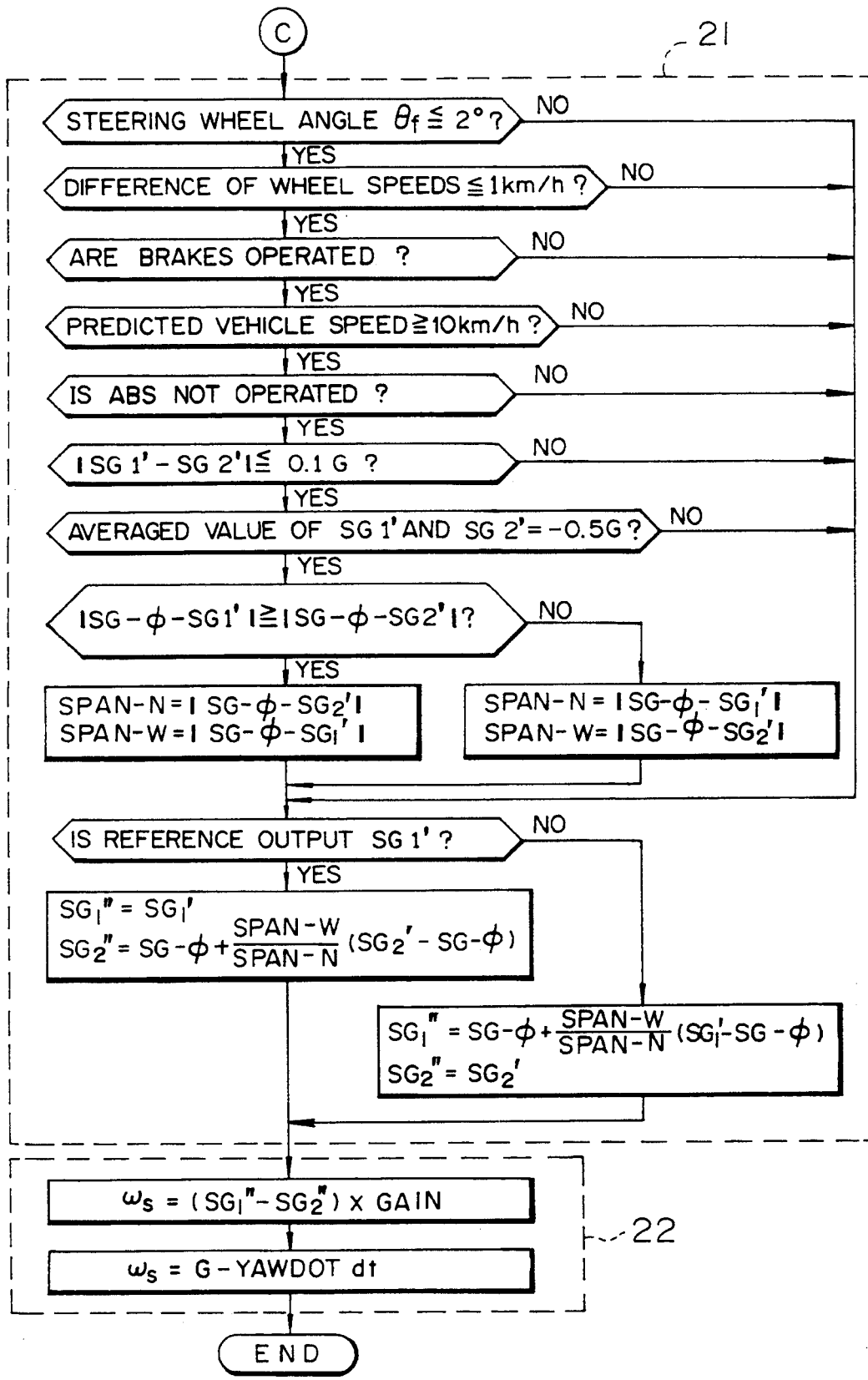
FIG. 9 is another example of a flow chart for showing in detail the output correcting method of the acceleration sensor.

In FIGS. 8 and 9, there are shown flow charts for explaining execution of the above-explained operations in detail.

That is to say, at steps 201 and 202 corresponding to the G-sensor output fetching unit 19 previously explained in FIG. 6, the outputs $S_{GA}$ and $S_{GB}$ from the G-sensors are fetched every 1 ms by, for instance, a 10-bit A/D converter, and then an average value calculated from 4 pieces of fetched data is supplied to the G-sensor output fetching unit 19 every 5 ms as the output signals $S_{G1}$ and $S_{G2}$.

In addition, at steps 203 to 213 corresponding to the zero-point correcting unit 20, when all of the following conditions are satisfied, neutral points SG1-$\phi$ and SG2-$\phi$ of the outputs from the respective sensors $G_A$, $G_B$ are updated by correction values. These conditions are; (i) for instance, at least one of the parking brakes and foot brakes and operated while the vehicle is stopped; (ii) the vehicle speed is equal to, or lower than 10 km/h; and (iii) all of the wheel speeds are equal to, or lower than 10 km/h; and further (iv) the values of the G-sensors outputs $S_{G1}$, $S_{G2}$ are nearly equal to the neutral point (namely, a point corresponding to "OG") of the reference output characteristic, in other words, within ±10% of the output corresponding to the detected maximum acceleration. This updating operation is repeated if the above-described conditions (i) to (iv) are satisfied, and correspond to a positional shift in the neutral point of the output characteristic due to temporal variations in temperatures.

Also, the above-described conditions (i) to (iv) are also utilized so as to achieve such an object that overall detecting operations for the vehicle speed sensor 5, the wheel speed sensor 3 and the G-sensors $G_A$, $G_B$ can be confirmed. Furthermore, two neutral points are produced from the output signals $S_{GA}$ and $S_{GB}$ of the G-sensors $G_A$ and $G_B$ in the above-described preferred embodiment, and thus either one of these neutral points may be output as the correction value. In accordance with this preferred embodiment, it is so arranged that the comparison is made between these two neutral points, and thus the larger neutral point is output as the correction value. As alternative methods, it may be conceived that the smaller neutral point is output as the correction value, the neutral point close to the neutral point of the reference output is output as the correction value, and also the reference output is output as the correction value.

A proper method is selected from the above-described methods, taking account of an amount of computation and of utilization of the outputs from the G-sensors in other control units.

Subsequently, a difference between a neutral point the correction value output and a neutral point of the non-corrected output, is continuously added to the non-corrected output so that the neutral points of two outputs are coincident with each other. Then, this coincident point is assumed as a common point SG-$\phi$.

Next, the span correcting unit 21 updates the gains SPAN-N and SPAN-W for span correction when the vehicle is running straight on a road with a certain acceleration, there is no yawing motion and the difference between the outputs of two G-sensors is very small. For example, the updating of the gains are made when all the following conditions (a)-(f) are satisfied. (a) the steering angle is within ±2 degrees in running of the vehicle; (b) the vehicle speed is 10 km/h or more; (c) deceleration (negative acceleration) is 0.5 G; (d) the difference between the speeds of the left and right non-driven wheels is within 1 km/h of one another; (e) ABS system is not in operative; and (f) the difference between the output signals SG1' and SG2' is 0.1 G or less.

It should be noted that although the above-described certain acceleration is preferably selected to be such a value at braking operation of the vehicle during which a larger absolute value can be obtained as compared with the value at the neutral point, this certain acceleration value may be picked up while the vehicle is positively accelerated. Also, when the above-described conditions (a) to (f) are satisfied, a difference is calculated between the signal SG-$\phi$ and the signal SG1', or between the signal SG-$\phi$ and the signal SG2', and therefore a large value is utilized as one span correcting gain SPAN-W, whereas a small value is used as the other span correcting gain SPAN-N. In other words, the large span is used as the reference output, and the span correction is carried out by multiplying the non-reference output with a ratio of SPAN-W to SPAN-N.

There are a method for selecting a small span as the correction value and another method for selecting an output close to the span and the correction value among the correction outputs in accordance with the span correcting methods other than the above-described methods. Similarly, a proper span-correcting method may be selected, taking account of the computation amount and utilization in other portions of the G-sensors.

The above-described correction operation is repeated every time the above-described conditions are satisfied, and responds to change of the span due to the temperature variations. Also, the above-described conditions have another object to confirm the operations of the wheel speed sensor, G-sensors and the like.

Furthermore, the yawing-momentum calculating unit 22 calculates so-called "yawing angular acceleration (d/dt (ω))" by obtaining a difference between the output signals "SG1" and "SG2" which have been corrected by way of the above-explained method, and then by multiplying this difference with a coefficient "GAIN" related to the mounting distance of the G-sensors and the unit.

Thereafter, the yawing momentum which has been detected in accordance with the above-described method, is used as the feedback signal in order to control the yawing motion of the vehicle 100, which will now be explained in the following description. In a so-called "split-μ path" (namely, a load surface on which coefficients of friction for right and left wheels of a vehicle are different from each other), as shown in FIG. 11A, when the vehicle is suddenly braked, the vehicle produces yawing motion along a counterclockwise direction. In FIG. 11B, there are shown both a yawing angle "θ" of the vehicle and a yawing velocity "ω" thereof during this braking operation. In this graphic representation, curves 81 and 83, indicated by solid lines, represent both a yawing angle of the wheel and a yawing angular velocity in case that the 4-wheel steering system is not operated, whereas curves 82 and 84 as indicated by dotted lines represent both a yawing angle of the wheel and a yawing angular velocity in case that the 4-wheel steering system is under operation. If such a yawing motion happens to occur, a car driver cannot control the vehicle, resulting in an occurrence of a dangerous condition. This yawing motion is caused by unbalanced forces given to the respective wheels of the vehicle, and thus such a dangerous condition may be avoided by controlling the braking force and the steering angle of the wheel. Consequently, in accordance with the present invention, the 4-wheel steering system (4WS) is controlled by utilizing the yawing momentum detected by the above-described operation as the feedback signal, and therefore the yawing motion of the vehicle is intended to be controlled.

Figure 10:
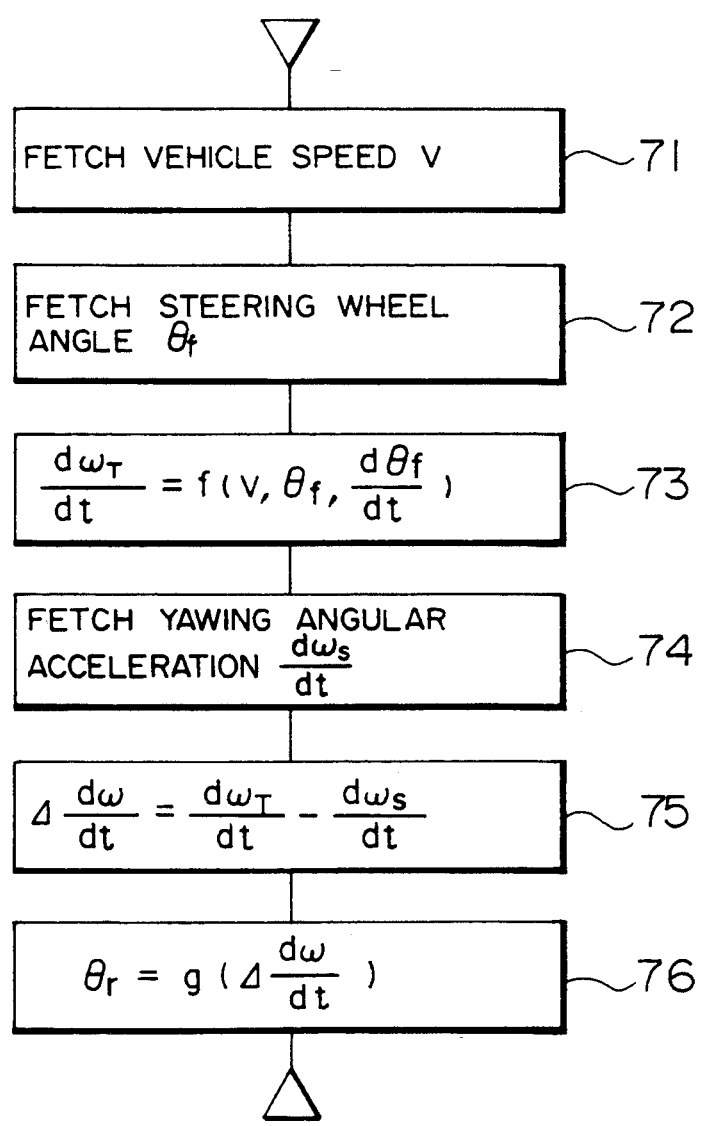
FIG. 10 is a flow chart for showing in detail a yawing-momentum feedback control method of the motion control apparatus for the vehicle.

FIG. 10 is a flow chart for representing a method for calculating a steering angle "θr" or 4WS to control the yawing motion of this vehicle. This routine is initiated for every passing of a predetermined time interval (for example, 5 ms) and the flow operation is executed.

At a first process 71, a vehicle speed V is calculated from the wheel speed sensor 3 and is fetched via an A/D converter or the like. At the next process 72, a steering angle θf is similarly fetched via the A/D converter or the like. At this time, a primary temporal differential component d/dt (θf) is simultaneously obtained from the steering angle θf. At a process 73, target yawing angular acceleration d/dt (ω$_T$) is determined based on the fetched signals V, θf and d/dt (θf). Furthermore, the yawing angular acceleration d/dt (ωs) obtained by the yawing-momentum calculating unit 22 (see FIG. 6), is fetched at a process 74. Then, deviation Δd/dt (ω) between the fetched acceleration signals d/dt (ω$_T$) and d/dt (ωs) is obtained at a process 75, and the steering angle θr is calculated from this deviation Δd/dt (ω) so as to control the 4WS system at a process 76. In accordance with the present embodiment, safe driving of the vehicle can be achieved by control of this 4WS system, and the momentum as indicated by reference numerals 82 and 84 is represented.

As apparent from the above detailed description of the present invention, various errors in detecting of the yawing momentum can be eliminated in accordance with the present invention, which are caused by the characteristics inherent to the acceleration sensors and also the sensor mounting structure or the like. Thus, the yawing momentum of the vehicle can be correctly detected. There is such a particular technical advantage that the motion control apparatus with the excellent motion control-abilities can be provided by utilizing such a correctly detected yawing momentum.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A yawing-momentum detecting apparatus for a vehicle, comprising:
   a plurality of acceleration sensors disposed at symmetrical positions on said vehicle with respect to a vertical axis within a plane perpendicular to the vertical axis passing through a gravity center of said vehicle;
   means for calculating yawing momentum of said vehicle occurring around said vertical axis based upon outputs from said plurality of acceleration sensors; and
   characteristic correcting means for correcting output characteristics of said plural acceleration sensors under known acceleration values to coincide with reference input-output characteristic values when said known acceleration values are obtained under a certain vehicle operating condition.

2. A yawing-momentum detecting apparatus as claimed in claim 1, wherein said characteristic correcting means includes:
   means for correcting input-output characteristics of said plurality of acceleration sensors obtained when vehicle acceleration is zero and said vehicle is stopped to coincide with a reference value for such a vehicle operating condition; and
   means for correcting input-output characteristics of said plurality of acceleration sensors obtained when the vehicle acceleration is at the known value under a predetermined driving condition.

3. A yawing-momentum detecting apparatus as claimed in claim 2, wherein said plurality of acceleration sensors includes two acceleration sensors disposed at symmetrical positions with respect to a center line in forward and backward directions of the vehicle which passes through said vertical axis, and wherein also each of said acceleration sensors is disposed in such a manner that a direction of acceleration to be detected is coincident with a direction of said center line.

4. A method for detecting yawing momentum of a vehicle, said method comprising the steps of:
   fetching output signals derived from a plurality of acceleration sensors disposed at symmetrical positions on said vehicle with respect to a vertical axis within a plane perpendicular to the vertical axis passing through a gravity center of said vehicle;

correcting said output signals of said plurality of acceleration means under known acceleration values to coincide with reference input-output characteristic values when said known acceleration values are obtained under a certain vehicle operating condition; and calculating yawing momentum of said vehicle occurring around said vertical axis based on said output signals from said plurality of acceleration sensors.

5. A motion controlling apparatus for a vehicle, comprising:

a plurality of acceleration sensors disposed at symmetrical positions on said vehicle with respect to a vertical axis within a plane perpendicular to the vertical axis passing through a gravity center of said vehicle;

means for calculating yawing momentum of said vehicle occurring around said vertical axis based upon outputs from said plurality of acceleration sensors;

characteristic correcting means for correcting input-output characteristics of said plural acceleration sensors under known acceleration values to coincide with reference input-output characteristic values when said known acceleration values are obtained under a certain vehicle operating condition;

means for calculating target yawing momentum based on a vehicle speed and a driver-manipulated steering angle of said vehicle; and means for adjusting at least one of a steering apparatus and a braking apparatus of said vehicle such that the yawing momentum obtained by said yawing-momentum calculating means is coincident with said target yawing momentum.

* * * * *